350-174
CROSS REFERENCE
SEARCH ROOM

Dec. 20, 1960 D. V. RIDGEWAY 2,965,706

COLOUR TELEVISION PROJECTION SYSTEMS

Filed Aug. 28, 1957 2 Sheets-Sheet 1

Inventor
D. V. RIDGEWAY
By
Holcombe, Wetherill & Brisebois
Attorneys

COLOUR TELEVISION PROJECTION SYSTEMS

Filed Aug. 28, 1957 2 Sheets-Sheet 2

Inventor
D.V. RIDGEWAY
By
Holcombe, Wetherill & Brisebois
Attorneys

United States Patent Office 2,965,706

Patented Dec. 20, 1960

2,965,706

COLOUR TELEVISION PROJECTION SYSTEMS

Denis V. Ridgeway, Cambridge, England, assignor to Pye Limited, Cambridge, England, a British company Filed Aug. 28, 1957, Ser. No. 680,820

Claims priority, application Great Britain Aug. 30, 1956

10 Claims. (Cl. 178—5.4)

The present invention relates to colour television projection systems and more particularly to such systems which are to be used for the projection of television images on to screens of considerable size, for example, screens of the proportion of cinema screens.

The projection of coincidental light beans on to screens of the magnitude of those used in public cinemas gives rise to problems not present in smaller projection systems, for example, those used domestically.

One of the main difficulties associated with the use of reflecting surfaces, particularly plane reflecting surfaces where the material is relatively thin, is that such surfaces are prone to distortion if not mounted carefully. More particularly the invention relates to projection systems as referred to that use two large plane reflectors, one of the dichroic type and the other of the partially reflecting type.

According to the invention the two reflectors are mounted in a vertical plane, the reflectors each being supported so that they may be turned about horizontal or vertical axes over small distances for the purpose of adjusting them to superimpose optically the images from the plurality of light sources.

In accordance with the invention, the projection system is one in which three separate beams of the primary colours, for example, red, blue and green are generated, these beams being combined by means of the reflecting systems so that they impinge accurately on a screen to give as near as possible a correct reproduction in colour of the original scene. It will be appreciated that with the magnitude of the distances involved in cinema type projection equipment extreme accuracy is needed to superimpose the beams, and it therefore follows that the projection equipment must be capable of precise adjustments in many of its components and in particular, that the reflectors must not be liable to distortion during the said adjustments or due to vibration or other causes.

In order that the invention may be more clearly understood reference will now be made to the accompanying drawings which show one specific embodiment thereof by way of example and in which.

Figure 1:
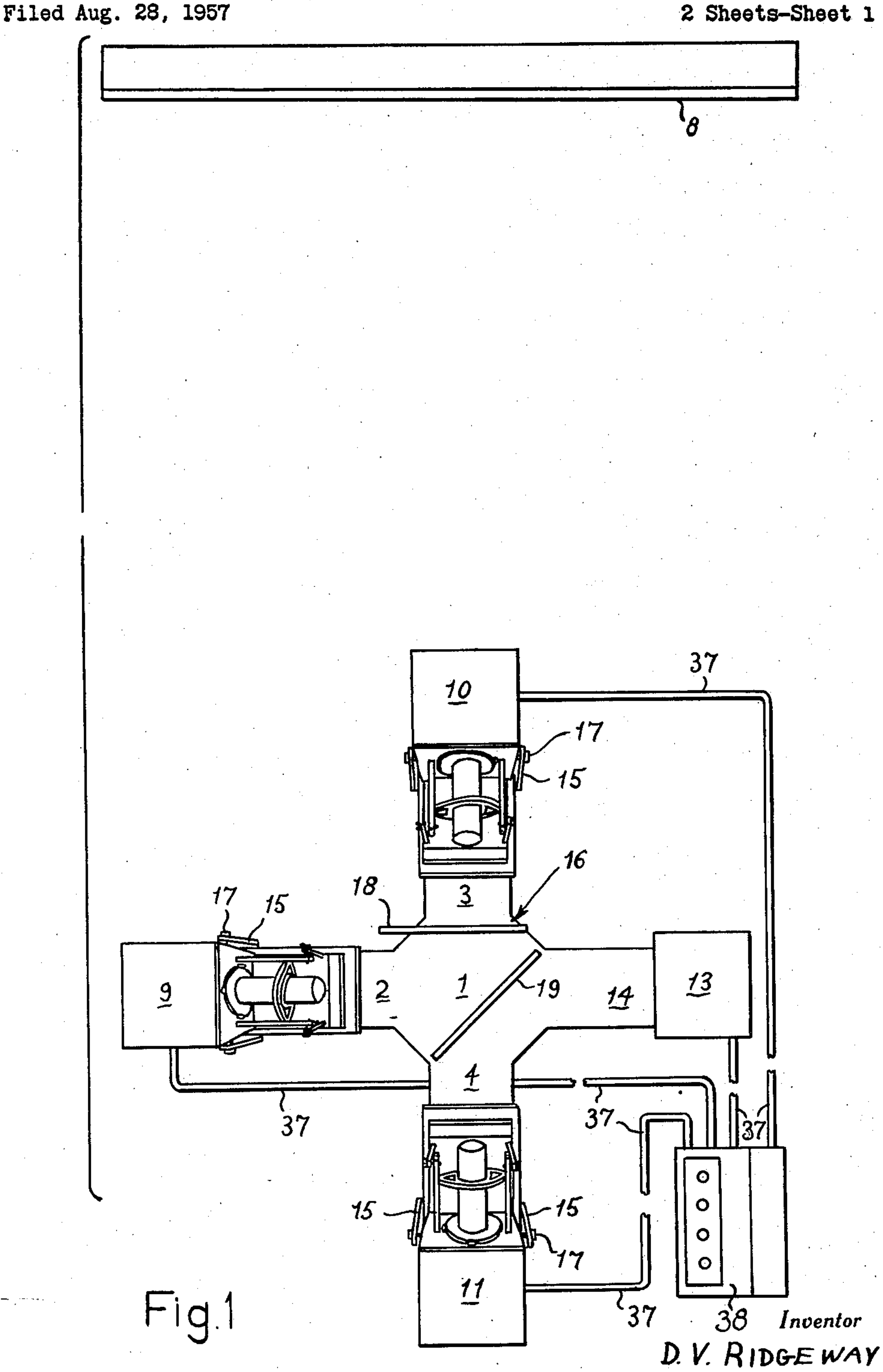
Figure 1 shows a plan view of the apparatus.

Referring to the drawings, which are to be considered largely schematic, there is provided a supporting base framework 1 which is of generally cruciform shape, the three arms 2, 3 and 14 of which are supported on adjustable jacks 5 which comprise a screw passing through threaded apertures in the arms with a control nut or handle 6 and having a mounting foot 7 so that the whole structure can be adjusted in situ to allow for uneven floors or slight variations in the mounting of the screen 8 in its position. The supporting framework 1 is of rigid construction and preferably supports the projection equipment in such a manner that the whole is approximately a balanced structure having a centre of gravity lying within the triangle formed by the three arms. Three projectors are provided, as the basis for a three-colour system, 9 being the "blue" projector, 10 the "red" projector and 11 the "green" projector. Each projector includes a cathode-ray tube and optical system and adjustment means therefore but these have not been shown as per se they form no part of the invention. In order to provide mechanical symmetry, the extra high tension power supplies 13 and other electrical equipment are located on a fourth arm 14 as shown more particularly in Figure 1.

Each projector is mounted at an angle of 25 degrees to the horizontal so that the beam of light proceeding from each projector to the screen 8 passes through the reflector system generally indicated at 16, without interference from the other two projectors. Actually any suitable angle could be chosen but 25 degrees has proved satisfactory in experiments conducted with the present size of the casings housing the individual projectors. Each projector is adjustably mounted in a stirrup 15 so that it may be pivoted about the centre of its exit pupil and thus with respect to the reflector system. Having been adjusted, each projector can be firmly clamped in the desired position by clamping screws 17, one on each side of the projector casing. Since such clamping arrangements form no part of the present invention they are not described in more detail here but generally they may comprise a screw projecting from each side of the casing the said screw passing through an aperture in the stirrup with a spring, washer or other movement-damping means being provided between the stirrup and the projector so that the projector does not move when it has been clamped by tightening the screw 17.

The projector 10 dealing with the red beam is situated nearest the screen 8 and causes its beam to be directed towards a dichroic reflector 18 on the side facing the screen 8. The dichroic reflector 18 has the property of reflecting red rays and transmitting all other rays so that therefore the red rays from the projector 10 reach the screen 8 via the dichroic reflector 18. The blue projector 9 is situated on one side of the equipment and since it automatically generates a much greater proportion of blue rays than is desirable the rays are caused to impinge on a partially reflecting surface 19 which may be silvered or aluminised and a proportion of the blue rays is reflected through the dichroic reflector 18 since this is arranged to transmit rays of all colours other than red and the said blue rays consequently reach the screen 8. The unwanted portion of the rays pass through the partial reflector 19 which is located at 45 degrees to the projection axis between the equipment and the screen. The green projector 11 which also generates more light than is needed is located on the remote side of the dichroic reflector 18 from the screen 8 and its rays also pass through the partial reflector 19 suffering appreciable loss and also through the dichroic reflector 18 without any appreciable loss. By a suitable alignment of the projectors and reflectors the light beams may be accurately registered on to the screen 8.

The screen 8 is hroizontally cylindrical and it may be mounted in any convenient fashion. Such mounting means do not form part of the invention and have therefore not been illustrated but it will be apparent that any desired means may be employed. For example the screen could be mounted by mounting clips directly on to a wall surface or it could be arranged to be free standing by being carried on a suitable supporting stand. Other arrangements will be apparent to those skilled in the art to which the invention relates. It will be appreciated that from an optical point of view it is advantageous to have the reflecting surfaces 18 and 19 carried by glass plates of the thinnest possible kind and since the dichroic reflector 18 is approximately 30 inches by 24 inches in size it will be understood that distortion of this reflector would be inevitable if it were mounted in any other plane but the vertical. Whilst reference has been made to the possibility of adjusting the reflectors by pivoting them slightly about their two axes it will be understood that the reflectors will not depart from the vertical by more than a trifling amount.

Figure 3:
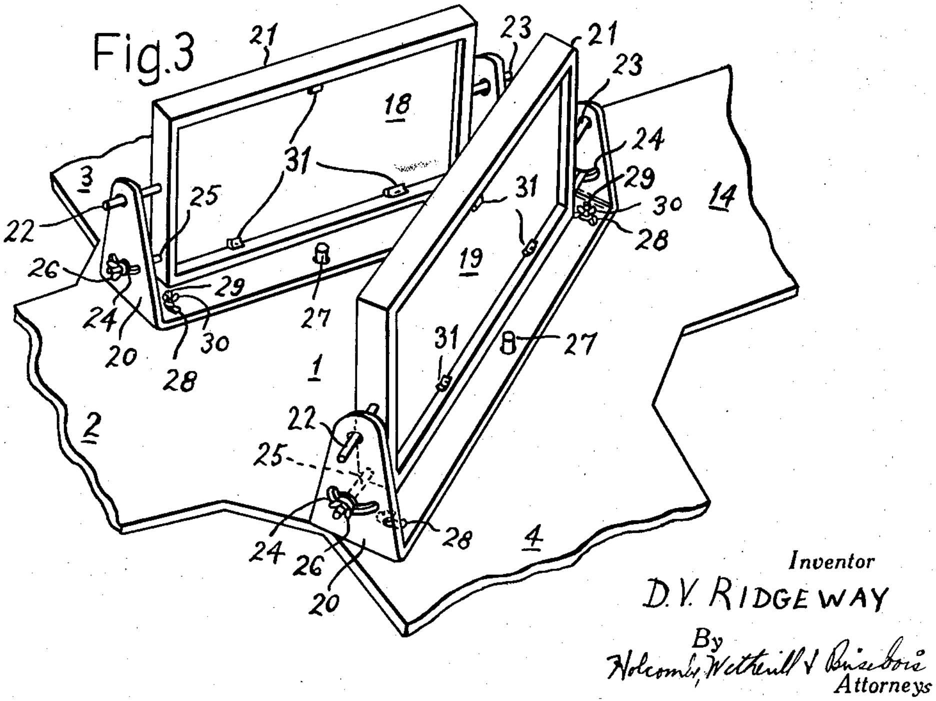
Figure 3 shows a perspective view of the housing for the mirrors.

Figure 3 shows a perspective view of a mounting for the reflecting surfaces 18 and 19 which has been found to be suitable and which allows for both the horizontal and vertical adjustments. The partially reflecting mirror 19 is mounted in a framework which in turn is mounted on a quasi gimbal system to enable the mirror to be orientated about an imaginary point at the centre of the mirror. The dichroic reflector 18 is also similarly mounted. The mirrors are adjusted in the horizontal and vertical planes in order to superimpose optically the three exit pupils of the three projectors. This adjustment is carried out by looking into the mirrors at the three exit pupils from the screen end of the system. By orientating the mirrors about their centres they may be tilted without affecting the relative optical magnifications.

Each gimbal system referred to consist of a U-shaped cradle 20 within which the framework 21 carrying the mirror is mounted by means of two pivots 22, 23 situated on either side of the framework 21 and in line with the optical centre of the mirror. Towards the base and on the sides of the cradle are provided two arcuate slots 24 through which pass pins 25 in the framework which is clamped in the position of adjustment by means of nuts 26. Each of the U-shaped cradles is pivotally mounted with respect to the framework 1 by a pivot 27 situated directly below the optical centre of the mirror.

Figures 2, 4:
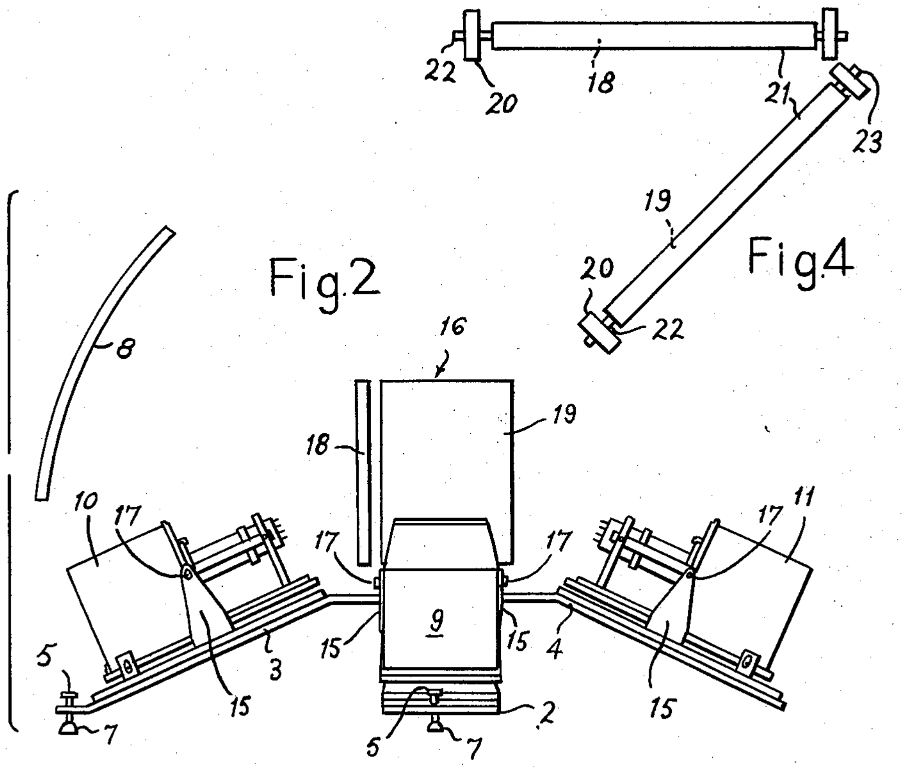
Figure 2 shows a side elevation.
Figure 4 shows a plan view of Fig. 3.

Two arcuate slots 28 are formed in the base of each U-shaped cradle, one at each end through which pass the pins 29 so that the cradle may be clamped in the position of adjustment by nuts 30. In order to provide a kinematic mounting for each mirror they are each held in three places by any suitable clamps 31 situated one at the top centre and the other two at the base as shown in Figure 3. The details of the mountings are not shown in Figures 1 and 2 to reduce complication of these drawings.

It will be apparent that many other forms of mounting for the mirrors may be provided so as to give the feature of the adjustable movement.

All other adjustments of a major nature needed to bring the light beams into correct relationship on the screen must be carried out by movement of the projectors or of the main framework 1. The actual means for effecting all these adjustments may take many forms and they have, therefore, not been illustrated in the sketches as not comprising essential elements of the present invention.

The screen 8 which is in the form of part of a horizontal cylinder may have vertical lenticulations.

Whilst the mounting of the equipment described is suitable for the floor of a cinema or like projection room wherein the screen is placed above the equipment and the audience viewing the screen from above the equipment, it will be understood that it is possible and may even be preferable in some circumstances for the equipment to be suspended from the roof of the cinema. However, the form of three-point suspension referred to herein would still be employed.

Since the projection equipment would occupy valuable space on the floor of an auditorium it is generally desirable to restrict the actual amount of equipment located on the supporting framework 1 and preferably therefore the control equipment is situated at any convenient place remote from the projectors and is connected to the projector equipment by suitable cables shown at 37. The control console 38 for example may include the operating controls, all the time base generators, most of the power supplies and, in fact, all equipment that is not actually needed at the projection point.

The invention therefore provides a system of the kind previously referred to in which the control means are remotely situated from and quickly connectable to the projection equipment. This arrangement has the very desirable feature that magnetic sources of interference, for example transformers, are remote from the projectors. This is important due to the need to superimpose accurately three identical rasters and because of this the equipment is particularly sensitive to stray magnetic fields. The only low frequency transformers mounted on the projection equipment are especially designed to avoid external fields and are concerned with providing power for heating the valves and cathode-ray tubes in the projectors in this part of the equipment. Another important design feature is the incorporation of the extra high tension unit 13 in the projection part of the equipment as it is not desirable to carry high voltages supplies of the order of 50 kilovolts or more, by way of the interconnecting control cables 37.

I claim:

1. Colour television projection apparatus for use in the reception of colour television signals comprising three projector devices, one for each of the three colour components, a screen for receiving and optically reconstituting a colour picture from the colour components projected thereonto from said projector devices, a single dichroic reflector located substantially parallel to said screen to reflect light from a first one of said projector devices and to transmit light from the second and third of said projector devices on to said screen, and a single partial reflector located to reflect light from a second one of said projector devices and to transmit light from the third of said projector devices on to said screen.

2. Colour television projection apparatus for use in the reception of colour television signals comprising three projector devices, one for each of the three colour components, a screen for receiving and optically reconstituting a colour picture from the colour components projected thereonto from said projector devices, a single dichroic reflector located in a vertical plane to reflect light from a first one of said projector devices and to transmit light from the second and third of said projector devices on to said screen, said first one of said projector devices being located to project its light beam in a direction away from said screen and substantially at right angles thereto and a single partial reflector located in a vertical plane to reflect light from a second one of said projector devices and to transmit light from the third of said projector devices on to said screen.

3. Colour television projection apparatus for use in the reception of colour television signals comprising three projector devices, one for each of the three colour components, a screen for receiving and optically reconstituting a colour picture from the colour components projected thereonto from said projector devices, a single dichroic reflector located to reflect light from a first one of said projector devices and to transmit light from the second and third of said projector devices on to said screen, said first one of said projector devices being located between said screen and said single dichroic reflector a single partial reflector located to reflect light from a second one of said projector devices and to transmit light from the third of said projector devices on to said screen, and means for adjusting each of said reflector devices between extreme positions on each side of a vertical plane.

4. Colour television projection apparatus for use in the reception of colour television signals comprising three cathode ray tube projector devices, one for each of the three colour components, a screen for receiving and optically reconstituting a colour picture from the colour components projected thereonto from said projector devices, a single dichroic reflector located substantially parallel to said screen to reflect light from a first one of said projector devices and to transmit light from the second and third of said projector devices on to said screen, a single partial reflector located to reflect light from a second one of said projector devices and to transmit light from the third of said projector devices on to said screen, electrical control means for operating said projector devices located remote from said projector devices, and electrical cables interconnecting said control means and said projector devices.

5. Colour television projection apparatus for use in the reception of colour television signals comprising three projector devices, one for each of the three colour components, a screen forming part of a horizontal cylinder for receiving and optically reconstituting a colour picture from the colour components projected thereonto from said projector devices, a single dichroic reflector adjustably mounted for movement between two extreme positions on each side of a vertical plane and located to reflect light from a first one of said projector devices and to transmit light from the second and third of said projector devices on to said screen, said first one of said projector devices being located to project its light beam in a direction away from said screen and substantially at right angles thereto and a single partial reflector adjustably mounted for movement between two extreme positions on each side of a vertical plane and located to reflect light from a second one of said projector devices and to transmit light from the third of said projector devices on to said screen.

6. Colour television projection apparatus for use in the reception of colour television signals comprising a support stand, three arms on said support stand projecting from a central hub, a projector device mounted on each of said arms adjacent the outer end thereof, one projector for each of the three colour components, a screen for receiving and optically reconstituting a colour picture from the colour components projected thereonto from said projector devices, said projector devices being positioned to throw light beams towards said hub, a single dichroic reflector located on said hub to reflect light from a first one of said projector devices and to transmit light from the second and third of said projector devices on to said screen, a single partial reflector located to reflect light from a second one of said projector devices and to transmit light from the third of said projector devices on to said screen, and means for adjusting the end of at least one of said arms relatively to the floor.

7. Colour television projection apparatus for use in the reception of colour television signals comprising a support stand, three arms on said support stand projecting from a central hub, a projector device mounted on each of said arms adjacent the outer end thereof, one projector for each of the three colour components, a screen for receiving and optically reconstituting a colour picture from the colour components projected thereonto from said projector devices, said projector devices being positioned to throw light beams towards said hub, a first gimbal-like suspension device located on said hub, a single dichroic reflector mounted in said first suspension device to reflect light from a first one of said projector devices and to transmit light from the second and third of said projector devices on to said screen, a second gimbal-like suspension device located on said hub, a single partial reflector mounted in said second suspension device to reflect light from a second one of said projector devices and to transmit light from the third of said projector devices on to said screen, and means for adjusting the end of at least one of said arms relatively to the floor.

8. Colour television projection apparatus for use in the reception of colour television signals comprising a support stand, three arms on said support stand projecting from a central hub each of said arms sloping downwardly from said hub, a projector device mounted on each of said arms adjacent the outer sloped end thereof, one projector for each of the three colour components, a screen for receiving and optically reconstituting a colour picture from the colour components projected thereonto from said projector devices, said projector devices being positioned to throw light beams towards said hub, a first gimbal-like suspension device located on said hub, a single dichroic reflector mounted in said suspension device to reflect light from a first one of said projector devices and to transmit light from the second and third of said projector devices on to said screen, a second gimbal-like suspension device located on said hub, a single partial reflector mounted in said second suspension device to reflect light from a second one of said projector devices and to transmit light from the third of said projector devices on to said screen, means for locking at least one of said gimbal-like suspension devices in a position of adjustment, and means for adjusting the end of at least one of said arms relatively to the floor.

9. Colour television projection apparatus for use in the reception of colour television signals comprising a support stand, four arms on said support stand projecting from a central hub, a cathode ray tube projector device mounted on each of three of said arms adjacent the outer end thereof, one projector for each of the three colour components, a screen for receiving and optically reconstituting a colour picture from the colour components projected thereonto from said projector devices, said projector devices being positioned to throw light beams towards said hub, a single dichroic reflector located on said hub to reflect light from a first one of said projector devices and to transmit light from the second and third of said projector devices on to said screen and a single partial reflector located to reflect light from a second one of said projector devices and to transmit light from the third of said projector devices on to said screen, means for adjusting the end of at least one of said arms relatively to the floor, and high voltage operating gear for said projector devices located on said fourth arm.

10. Colour television projection apparatus for use in the reception of colour television signals comprising a support stand, four arms on said support stand projecting from a central hub, each of said arms sloping downwardly from said hub, a cathode ray tube projector device mounted on each of three of said arms adjacent the sloped end thereof, one projector for the red colour component, one projector for the blue colour component and one projector for the green colour component, a screen for receiving and optically reconstituting a colour picture from the colour components projected thereonto from said projector devices, said projector devices being positioned to throw light beams towards said hub, a single dichroic reflector located on said hub to reflect light from said red colour component projector device and to transmit light from said blue and green colour component projector devices on to said screen and a single partial reflector located to reflect light from said blue colour component projector device and to transmit light from said green colour component projector device on to said screen, means for adjusting the end of at least one of said arms relatively to the floor, and high voltage operating gear for said projector devices located on said fourth arm.

References Cited in the file of this patent

UNITED STATES PATENTS

| | | |
|---|---|---|
| 2,625,853 | Hayward | Jan. 20, 1953 |
| 2,724,737 | Hogan | Nov. 22, 1955 |
| 2,752,419 | Bailey | June 26, 1956 |